Patented Dec. 12, 1939

2,183,127

UNITED STATES PATENT OFFICE 2,183,127

PROCESS FOR PREPARING ISOPHORONE

Thomas H. Vaughn and Donald R. Jackson, Niagara Falls, N. Y., assignors to Union Carbide and Carbon Research Laboratories, Inc., a corporation of New York No Drawing. Application March 19, 1938, Serial No. 196,904

13 Claims. (Cl. 260—586)

This invention relates to the production of isophorone; and more especially it concerns a process for the production of isophorone and certain other condensation products involving the catalytic condensation of acetone in the vapor phase, in the presence of calcium carbide, calcium oxide or hydroxide, or mixtures containing the same.

Isophorone has important value as a high-boiling solvent, and as an intermediate for the production of various organic compounds, such as its hydrogenation product, trimethylcyclohexanone. However, as yet its field of commercial use has been considerably limited because of the lack of an efficient and economical method for its preparation.

Heretofore isophorone has been prepared by the condensation of acetone in the liquid phase in the presence of certain catalytic agents, such as the sodium alcoholates and sodium amide. The former are unsatisfactory since larger amounts of phorone than of the desired isomeric cyclic ketone—isophorone—are produced in the resultant acetone condensation. Processes using sodium amide as catalyst yield only around 5% of isophorone, together with undesired high-boiling condensation products. Moreover, the costly sodium amide is decomposed by the water liberated in the condensation, and is not recoverable.

The use of calcium carbide as liquid phase catalyst for acetone condensation is objectionable for the reason that it is not subject to control and gives variable amounts of isophorone. The reaction cannot always be started; and in most instances when once started is too vigorous, yielding large amounts of high-boiling substances and tarry residues. At times solid tars are the major product.

The present invention is based upon applicants' discovery that especially satisfactory yields of isophorone may be secured by condensing acetone in the vapor phase while in contact with calcium carbide, or with some form of lime, either hydrated or anhydrous. Although calcium carbide has been found to function very effectively per se in the process, it is also capable of forming calcium oxide and/or hydroxide under the conditions of the condensation.

According to the invention the vapors of acetone are contacted with the catalyst, such as slaked lime, burnt lime, calcium carbide, or mixtures containing lime—such as the residues produced in the dry generation of acetylene by hydration of calcium carbide. An example of such residue suitable for use contained around 93% of calcium hydroxide, 1.28% of calcium carbonate, 3.7% magnesium oxide, 2.56% silica, and 1.6% alumina, together with small amounts of ferric oxide, sulphur and phosphorus compounds and carbon.

During contact of the acetone vapors therewith, the catalyst is maintained at an elevated temperature within the range between 200° and 700° C., and preferably those within the range between 300° and 450° C. Temperatures around 350° C. are especially efficacious.

Various methods may be employed for providing contact between the acetone vapors and the catalyst. The latter in more or less finely-divided form may be packed in a reaction tube or a column through which the acetone vapors are passed at a regulated rate while maintaining the catalyst at the desired temperature.

Especially favorable yields of isophorone are secured in operations wherein the catalyst, preferably in finely-divided form, is agitated during passage of the acetone vapors in contact therewith. Thus acetone vapors may be passed through a rotary ball mill containing finely-divided calcium carbide or calcium oxide and maintained at the desired reaction temperature, while rotating the mill.

The condensible components of the vaporous reaction mixture leaving the high temperature reaction zone are condensed; and the resultant condensate subsequently is distilled at atmospheric pressure to recover acetone and then fractionally distilled under subatmospheric pressure to recover the isophorone, mesityl oxide, and the higher-boiling condensation products.

In practice, it is advantageous to pass the vaporous products leaving the reaction zone through a precooler wherein a substantial portion of the higher-boiling products are condensed, following which the resultant products flow through a stripping condenser or column heated to around 100° C., wherein the high-boiling components condensible at this temperature are isolated. The residual vapors are passed through a condenser maintained at 10° C. where the acetone and portions of the water are condensed and recovered. Uncondensed gases, consisting principally of methane, flow from the condenser and may be recovered if desired.

The condensate from the stripping vessel, after separation of the lower water layer which forms upon standing, is fractionally distilled, at first under atmospheric pressure to recover unreacted acetone, and subsequently under subatmospheric pressure. The fraction boiling up to 105° C. under an absolute pressure of 20 mm. of mercury contains substantially all the isophorone and mesityl oxide. This fraction is refractionated under subatmospheric pressure with the separate recovery of the isophorone, boiling between 95° and 96° C. under 15 mm. of mercury absolute pressure.

The following examples are intended merely to illustrate the invention.

Example 1

Four hundred and fifty cc. of 20-mesh calcium carbide were placed upon a screen inserted within a reactor 3 inches in diameter and 12 inches in length. The reactor and carbide were heated to 400° C., and 250 grams of acetone vapors were passed through the calcium carbide during a period of 6 hours while the reactor was vigorously agitated. The vaporous reaction products were withdrawn continuously and passed through a condenser; and the condensed reaction products, upon fractional distillation under subatmospheric pressure, gave a satisfactory yield of isophorone, together with smaller amounts of mesityl oxide and other condensation products.

Example 2

Three kilograms of 20-mesh calcium carbide and 2 liters of 1¼ inch iron balls were loaded into an electrically-heated steel ball mill maintained at 400° C. Acetone vapors were passed through the heated ball mill at a rate of 480 grams per hour while the mill was revolved at a rate of 40 R. P. M. The vaporous reaction products were passed through a water-cooled condenser; and the resultant condensate was fractionated under subatmospheric pressure. A very satisfactory yield of isophorone was secured.

Example 3

A steel reaction tube, 6 inches in diameter and 9 feet long, was filled with approximately 80 pounds of lime pellets (calculated on a dry basis) produced by the compression of dry calcium hydroxide generator sludge produced by the hydration of calcium carbide. The catalyst tube and contents then were heated to 350° C. and the excess water driven from the lime. Over a period of 16 hours 31,870 grams of acetone vapors were passed into the top of the tube at a constant rate, and the vaporous reaction products were continuously withdrawn and passed through a condensing system, including a condenser cooled with water at 60° C., a stripping vessel maintained at 100° C., and a final condenser cooled to 10° C. The major portion of the higher-boiling products was condensed in the first-named condenser and, together with the remainder of the higher-boiling products, was condensed in the stripping vessel and recovered. The acetone, a portion of the water and a small amount of condensation products were condensed in the final condenser and recovered. The condensates from the first condenser and stripping vessel were redistilled under vacuum, the resultant distillate being separated into (1) a fraction boiling up to 100° C. at 20 mm. of mercury absolute pressure; (2) a fraction boiling between 100° and 105° C. under the same reduced pressure; and (3) a non-distilled residue. Redistillation under vacuum of fraction 2 mentioned above yielded a product boiling at between 95° and 96° C. under 15 mm. of mercury absolute pressure, evidently very pure isophorone. A total isophorone yield of 25.2% based upon the acetone starting material was secured with a high efficiency.

The activity of the catalyst tends to diminish somewhat during the course of its use. Thus, during a 162-hour period of operation in the general manner described in Example 3, the total isophorone produced and recovered amounted to a yield of 18.8%, based upon the acetone starting material. The deactivation of the catalysts of this invention may be due to the formation thereon of surface coatings of tar and also calcium carbonate, resulting from the reaction of the lime with gaseous decomposition products formed in small amounts in the high-temperature condensation. The catalysts may be readily reactivated to a considerable extent merely by washing the same with cold acetone. Thus, a catalyst of the nature of that set forth in Example 3, and which had been deactivated to a point where it yielded around 10% of isophorone (based upon the acetone), was cooled, washed with 15 gallons of acetone and reheated to 350° C. and, upon passing acetone vapors therethrough for 5.5 hours at the rate of 2424 grams per hour, produced a yield of 17.5% of isophorone—based upon the acetone employed. The isophorone was equivalent to 85% by weight of the condensation products formed.

As heretofore indicated, it is not necessary to employ pure lime in the process. Indeed, substantially as good yields of isophorone are secured with the use of crude lime-containing residues from the generation of acetylene by controlled hydration of calcium carbide as are secured with pure calcium oxide or calcium hydroxide. Evidently the impurities present in this crude product are not responsible for the latter's catalytic activity in the process. This property of the lime and calcium carbide is not a function of basic compounds in general, since neither calcium carbonate nor sodium carbonate forms isophorone when acetone vapors are passed thereover under the conditions of operation of this process; and under such conditions potassium carbonate, potassium hydroxide and barium hydroxide give only traces of isophorone.

In the practice of the present invention, as illustrated in Example 3, the larger part of the higher-boiling condensation products consists of two ketones, both of which are yellow liquids. They are readily separated from each other and from other high-boiling products by fractional distillation in vacuo. The higher-boiling ketone has a composition evidently corresponding to the formula $C_{15}H_{22}O$, and is apparently formed by the condensation of 5 mols of acetone with the elimination of 4 mols of water. It has a sp. gr. at 23° C. of 0.99, and an index of refraction at that temperature of 1.5350. It boils at 143° C. under a pressure of 10 mm. of mercury absolute pressure; and yields a semi-carbazone melting between 198° and 199° C. The lower-boiling ketone has a composition apparently corresponding to the formula $C_{12}H_{18}O$, and evidently is formed by the condensation of 4 mols of acetone with the elimination of 3 mols of water. It has a sp. gr. at 23° C. of 0.996; and an index of refraction at that temperature of 1.5249. It boils at 130° C. under 10 mm. of mercury absolute pressure; and yields a semi-carbazone that melts between 165° and 166° C. This ketone is miscible with alcohols such as methanol and ethanol, acetone and higher ketones, isophorone, ethyl ether, and benzene. It is somewhat soluble in petroleum ether and ligroin; and is insoluble in dilute aqueous acids and alkalies.

In previously known processes for the production of isophorone from acetone, the products boiling higher than isophorone uniformly have been a complex mixture of numerous materials.

The preparation of isophorone from acetone in accordance with this invention may be conducted in apparatus fabricated from the ordinary materials of construction. Thus, the reaction has been successfully conducted both in apparatus constructed of glass and of iron. Brass or tin surfaces may be used in the colder parts of the equipment.

The vapor-phase process of the present invention has the important industrial advantages of being readily controlled, with the uniform production of relatively high yields of isophorone and low yields of valueless higher-boiling condensation products and tars. The catalysts used have the advantage of being readily available in any desired quantities and securable at very low cost. They may be reactivated when desired in simple manner—as by a treatment with cold acetone.

The invention is susceptible of modification within the scope of the appended claims.

We claim:

1. Process of preparing isophorone, which comprises contacting acetone vapors with a condensation catalyst essentially comprising a compound selected from the group consisting of calcium oxide, calcium hydroxide, and calcium carbide, and isolating isophorone from the vaporous reaction products thus produced.

2. Process of preparing isophorone, which comprises contacting acetone vapors at a temperature within the range between 200° C. and 700° C. with a condensation catalyst essentially comprising a compound selected from the group consisting of calcium oxide, calcium hydroxide, and calcium carbide.

3. Process of preparing isophorone, which comprises contacting acetone vapors at a temperature within the range between around 300° C. and around 450° C. with a condensation catalyst essentially comprising a compound selected from the group consisting of calcium oxide, calcium hydroxide, and calcium carbide.

4. Process for preparing isophorone, which comprises passing acetone in the vapor phase into intimate contact with a catalyst essentially comprising at least one compound selected from the group consisting of calcium oxide, calcium hydroxide, and calcium carbide, the said catalyst being in finely-divided form and maintained at an elevated temperature within the range between around 200° C. and around 700° C.

5. Process for preparing isophorone, which comprises passing acetone in the vapor phase into intimate contact with a catalyst essentially comprising at least one compound selected from the group consisting of calcium oxide, calcium hydroxide, and calcium carbide, while maintaining the catalyst at a temperature within the range between 200° C. and 700° C.

6. Process for preparing isophorone, which comprises passing acetone in the vapor phase into intimate contact with a catalyst essentially comprising at least one compound selected from the group consisting of calcium oxide, calcium hydroxide, and calcium carbide, while maintaining the catalyst at a temperature within the range between around 300° C. and around 450° C.

7. Process for preparing isophorone, which comprises passing acetone in the vapor phase into intimate contact with a condensation catalyst essentially comprising substantially anhydrous lime, continuously withdrawing the vaporous reaction products as formed, and separately recovering therefrom the isophorone thus produced.

8. Process as defined in claim 7, wherein is employed as catalyst the solid residue formed in the generation of acetylene from calcium carbide.

9. Process for preparing isophorone, which comprises passing acetone in the vapor phase into intimate contact with a condensation catalyst essentially comprising calcium carbide maintained at an elevated temperature within the range between around 200° C. and around 700° C., and separately recovering from the resultant reaction products the isophorone thus produced.

10. Process for preparing isophorone, which comprises passing acetone in the vapor phase at a uniform regulated rate into intimate contact with a catalyst essentially comprising a compound selected from the group consisting of calcium oxide, calcium hydroxide, and calcium carbide, while agitating the said catalyst, continuously withdrawing the vaporous reaction products as rapidly as formed, and separately recovering from the resultant reaction products the isophorone thus produced.

11. Process for preparing isophorone, which comprises passing acetone in the vapor phase at a uniform regulated rate into intimate contact with a catalyst essentially comprising a compound selected from the group consisting of calcium oxide, calcium hydroxide, and calcium carbide, while maintaining the catalyst in finely-divided form, continuously withdrawing the vaporous reaction products as rapidly as formed, and separately recovering from the resultant reaction products the isophorone thus produced.

12. Process for preparing isophorone, which comprises passing acetone in the vapor phase at a uniform regulated rate into intimate contact with a catalyst essentially comprising a compound selected from the group consisting of calcium oxide, calcium hydroxide, and calcium carbide, while removing from the surface of the catalyst non-catalytic compounds substantially as rapidly as formed, and separately recovering from the resultant reaction products the isophorone thus produced.

13. In the process for preparing isophorone, which comprises contacting acetone in the vapor phase with a catalyst selected from the group consisting of calcium oxide, calcium hydroxide, and calcium carbide, the steps for reactivating the spent catalyst which comprise cooling the latter, extracting the cooled catalyst with acetone, reheating the extracted catalyst, and again contacting acetone vapors with the catalyst.

THOMAS H. VAUGHN.
DONALD R. JACKSON.